(12) United States Patent
Wernersson

(10) Patent No.: US 7,822,338 B2
(45) Date of Patent: Oct. 26, 2010

(54) CAMERA FOR ELECTRONIC DEVICE

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1160 days.

(21) Appl. No.: 11/407,670

(22) Filed: Apr. 20, 2006

(65) Prior Publication Data

US 2007/0172229 A1    Jul. 26, 2007

Related U.S. Application Data

(60) Provisional application No. 60/760,899, filed on Jan. 20, 2006.

(51) Int. Cl.
*G03B 29/00* (2006.01)

(52) U.S. Cl. ....................................................... 396/429

(58) Field of Classification Search ................ 396/106, 396/268, 287, 374, 429; 348/14.02; 455/556.1
See application file for complete search history.

(56) References Cited

U.S. PATENT DOCUMENTS

| | | | |
|---|---|---|---|
| 4,367,934 A * | 1/1983 | Matsui ........................ | 396/103 |
| 5,949,504 A | 9/1999 | Kim | |
| 6,285,400 B1 | 9/2001 | Hokari | |
| 7,123,292 B1 * | 10/2006 | Seeger et al. ............. | 348/218.1 |
| 2002/0025163 A1 * | 2/2002 | Aruga et al. ................ | 396/429 |
| 2002/0051252 A1 * | 5/2002 | Chang et al. ................ | 358/505 |
| 2002/0113884 A1 | 8/2002 | Tanii et al. | |
| 2003/0112358 A1 * | 6/2003 | Hamada ................. | 348/333.12 |
| 2003/0125080 A1 * | 7/2003 | Shimamura .................. | 455/556 |
| 2004/0140965 A1 * | 7/2004 | Wang et al. .................. | 345/179 |
| 2005/0083405 A1 | 4/2005 | Imoto et al. | |
| 2005/0264677 A1 | 12/2005 | Uchida | |
| 2006/0023074 A1 * | 2/2006 | Cutler ...................... | 348/218.1 |

FOREIGN PATENT DOCUMENTS

| | | |
|---|---|---|
| EP | 1 158 786 A2 | 11/2001 |
| EP | 1 608 135 A1 | 12/2005 |
| GB | 2 400 261 A | 10/2004 |
| JP | 2-103023 | 4/1990 |
| JP | 10-145667 | 5/1998 |
| JP | 2005258718 | 9/2005 |

(Continued)

OTHER PUBLICATIONS

Online product information for DCR-TRV280 Digital8® Handycam® Camcorder DCR-TRV280, Sonystyle.com, accessed Apr. 14, 2006.

(Continued)

*Primary Examiner*—W. B. Perkey
(74) *Attorney, Agent, or Firm*—Myers Bigel Sibley & Sajovec

(57) ABSTRACT

An electronic device includes a support structure and a camera carried by the support structure and including a detector surface and a lens having an optical axis, and having a field of view. A display is carried by the support structure in a fixed relation to the camera. The display has a normal viewing angle perpendicular to a surface of the display. The field of view of the camera has a main line of sight extending at an acute angle to the normal viewing angle of the display.

18 Claims, 6 Drawing Sheets

FOREIGN PATENT DOCUMENTS

WO     WO 03/024090     3/2003

OTHER PUBLICATIONS

Translation of Chinese Office Action issued Dec. 4, 2009 for corresponding Chinese Application No. 200680051326.0.

Communication pursuant to Article 94(3) EPC for Application No. 07 703 833.9 - 1241 dated Nov. 12, 2009.

Japanese Office Action for corresponding Application No. 2008-550652 dated Jun. 28, 2010 (no translation).

* cited by examiner

CAMERA FOR ELECTRONIC DEVICE

RELATED APPLICATION

This application claims the benefit of and priority to U.S. Provisional Patent Application No. 60/760,899 titled "Camera for Electronic Device", filed Jan. 20, 2006, the disclosure of which is hereby incorporated herein by reference as if set forth in its entirety.

FIELD OF THE INVENTION

The present invention relates to a camera for use in an electronic device, such as a camera incorporated in a radio communication terminal for use in video telephony. More particularly, the invention relates to a solution for adjusting the viewing direction of a camera of an electronic device carrying a display.

BACKGROUND

The cellular telephone industry has had an enormous development in the world in the past decades. From the initial analog systems, such as those defined by the standards AMPS (Advanced Mobile Phone System) and NMT (Nordic Mobile Telephone), the development has during recent years been almost exclusively focused on standards for digital solutions for cellular radio network systems, such as D-AMPS (e.g., as specified in EIA/TIA-IS-54-B and IS-136) and GSM (Global System for Mobile Communications). Currently, the cellular technology is entering the so called 3rd generation (3G) by means of communication systems such as WCDMA, providing several advantages over the 2nd generation digital systems referred to above.

Many of the advances made in mobile phone technology are related to functional features, such as better displays, more efficient and longer lasting batteries, and means for generating polyphonic ring signals. One functional feature which has become more and more common is built-in cameras. Cameras with video camera functionality are available today in several mobile phones. With the entrance of high bit-rate services, such as EDGE (Enhanced Data-rates for GSM) and 3G, the availability and usability for video-related services will increase. In particular, mobile video telephony, with simultaneous communication of sound and moving images, has recently become commercially available.

For stationary use, video conference systems generally include a camera mounted on or beside a communication terminal, such as a personal computer (PC), or integrated in an internet protocol (IP) enabled phone. Use of such a system may be fairly straightforward, as the user is positioned in front of the terminal with the camera aiming towards the user. However, mobile video conferencing is a bit more cumbersome. The terminal may be positioned in a support unit on a desktop, from which a camera in the unit is aimed towards the object of interest to be captured, typically the user. A more common way of using a mobile phone for video conferencing with face to face transmission is when it is held, such that the built-in camera is manually aimed towards the user. When communicating through a mobile handheld terminal, the user therefore may hold the terminal steady in front of the face so that the receiving party can see the face of the user, i.e. the sending party.

A problem related to video conferencing with a radio terminal is caused by the fact that the built-in camera typically is placed adjacent to and parallel with the display, i.e. the optical axis of the camera is perpendicular to the display surface. The terminal therefore has to be aimed more or less 90° to the face, in order to get a proper image of the user. However, many users find this way of holding the terminal uncomfortable. Furthermore, for most mobile phone designs it may be difficult to use the terminal when placed on a desktop without additional supporting means, since it may require that the user's face be held over the terminal. A related problem is that the terminal may also include a small lamp aimed parallel with the camera to provide light to the object to be captured. When the camera, and the lamp, is aimed towards the face of the user at a 90° angle, there is also a risk that reflections of the user's face in the display surface will disturb the images presented on the display.

SUMMARY

An electronic device according to some embodiments of the invention includes a support structure, and a camera carried by the support structure and including a detector surface and a lens having an optical axis, and having a field of view. A display is carried by the support structure in a fixed relation to the camera. The display has a normal viewing angle perpendicular to a surface of the display. The field of view of the camera has a main line of sight extending at an acute angle to the normal viewing angle of the display. The electronic device may further include a transceiver configured to transmit an image captured by the camera and to receive a remotely generated image. The acute angle may be more than 0° and less than about 20°. In some embodiments, the acute angle may be between about 5° and about 20°. In particular, the acute angle may be between about 5° and about 10°.

The electronic device may be configured to simultaneously display both the image captured by the camera and the remotely generated image. In particular embodiments, the electronic device may be configured to simultaneously display both the image captured by the camera and the remotely generated image on the display.

The field of view of the camera may be defined by an operative region of the detector surface, which operative region may be displaced off-center in relation to the optical axis of the lens.

The detector surface may include an image sensor including a number of pixels, and the operative region may include a subset of said number of pixels. The detector surface may be rectangular, and the operative region may be displaced off-center towards one of two opposing edges of the detector surface. The image sensor may be a CMOS sensor and/or a CCD sensor. The detector surface may further include two complementary opposing edges perpendicular to the two opposing edges, and the operative region may be centered between the two complementary opposing edges of the detector surface.

The optical axis of the lens may be parallel to the normal viewing angle of the display. In some embodiments, the optical axis of the lens may be displaced off-center with respect to the detector surface. In particular embodiments, the optical axis of the lens may be displaced off-center with respect to the detector surface, towards the other of the two opposing edges of the detector surface.

The detector surface may include a number of pixels, each pixel including a sensor element and an auxiliary lens, wherein at least one of the auxiliary lenses has a focal length that may be inversely dependent on a distance from the at least one auxiliary lens to the optical axis of the camera lens.

The image sensor may be connected to an image signal processor that may be configured to define the operative region as a region of interest for reading out an image.

The electronic device may further include a microphone configured to receive an audio signal and to transmit the received audio signal using the transceiver, and a speaker configured to play an audio signal received using the transceiver.

Some embodiments of the invention provide a digital camera including a support member, a lens carried by the support member and having an optical axis, and a detector, carried by the support member under the lens and having a detector surface. The camera has a field of view with a main line of sight extending at an acute angle to the optical axis.

BRIEF DESCRIPTION OF THE DRAWINGS

The features and advantages of the present invention will be more apparent from the following description of the preferred embodiments with reference to the accompanying drawings, in which.

DETAILED DESCRIPTION OF EMBODIMENTS OF THE INVENTION

Figure 1A:
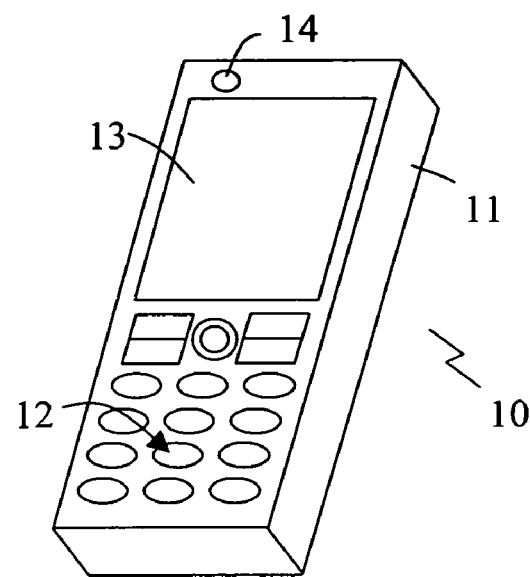
FIGS. 1A and 1B schematically illustrate a hand-held radio communication terminal including a digital camera and a display according to some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present description relates to the field of electronic devices including a camera and a display for presenting pictures captured by the camera, which are arranged such that a user may view the display while the camera is aimed at the same user. Some embodiments of the invention relate to a communication terminal configured for video telephony. Such a communication terminal may, for example, be a DECT (Digital European Cordless Telephone) telephone connectable to a PSTN (Public Switched Telephone Network) wall outlet by means of a cord, or an IP telephone having a housing including a display and a camera. In some embodiments, the communication terminal is a radio communication terminal, such as a mobile phone operable for communication through a radio base station and/or directly to another radio terminal.

Embodiments will now be described with reference to the accompanying drawings.

FIG. 1A illustrates an electronic device in the form of a portable communication terminal 10, such as a mobile telephone, according to some embodiments of the invention. Terminal 10 includes a support structure 11 including a housing, and a user interface including a keypad or keyboard 12 and a display 13. The terminal 10 may also include an audio interface including a microphone and a speaker, radio transceiver circuitry, an antenna, a battery, and a microprocessor system including associated software and data memory for radio communication, all carried by support structure 11 and contained within the housing. In addition to these elements, device 10 also includes a digital camera 14, an aperture of which is indicated in FIG. 1A.

As shown in FIG. 1A, the aperture of the camera 14 and the display 13 may be arranged such that both are visible from a common viewing location. For example, both the aperture of the camera 14 and the display 13 may be arranged on the same side of the housing 11. This way, the camera 14 may be aimed at a user while the user views the display 13. Accordingly, a communication terminal 10 may be used for video telephony.

Figure 1B:
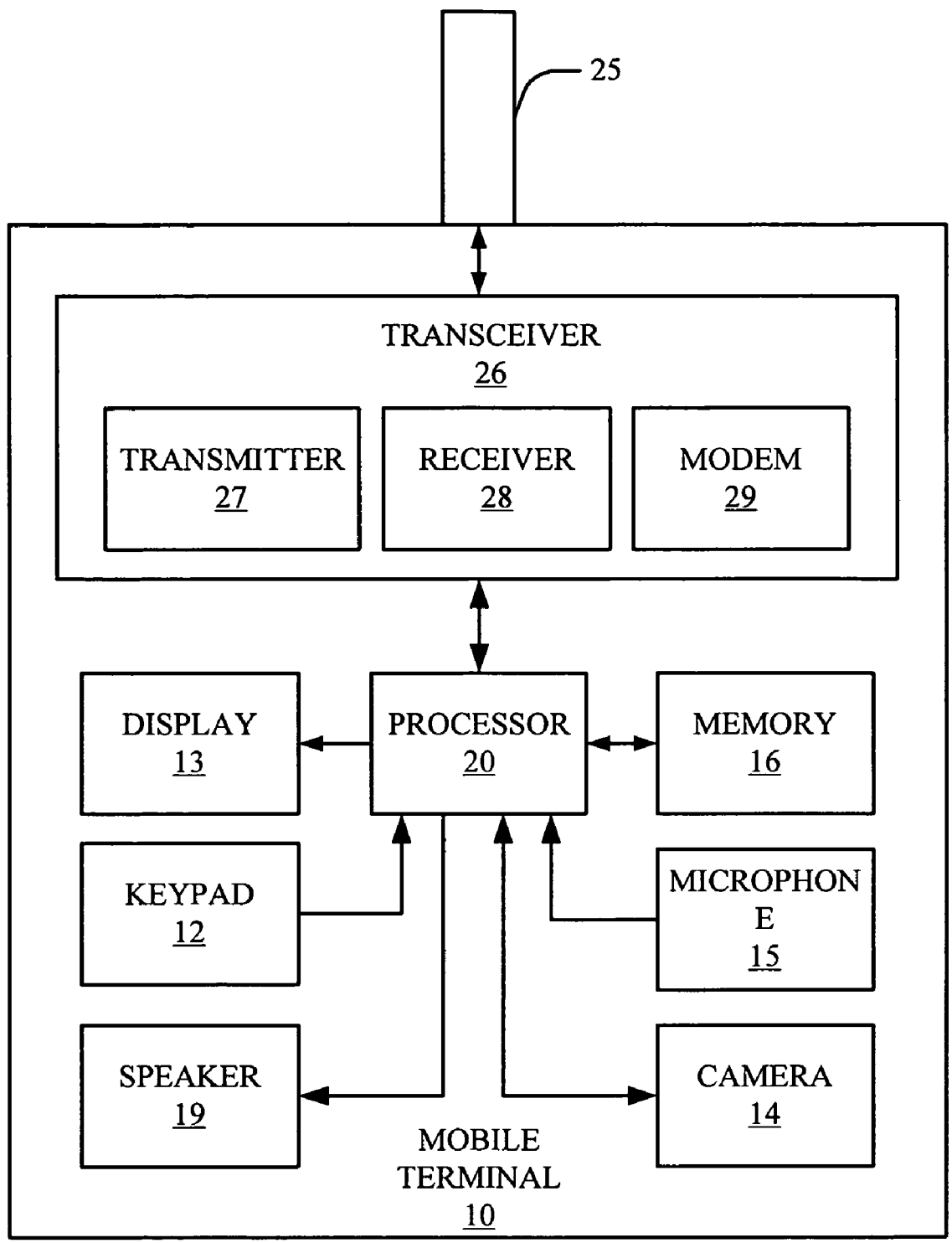

Embodiments of the present invention may be further described with reference to the schematic illustration of a communication terminal 10 shown in FIG. 1B. Referring now to FIG. 1B, an exemplary communication terminal 10, in accordance with some embodiments of the present invention, includes a keypad 12, a display 13, a transceiver 26, a memory 16, a microphone 15, and a speaker 19, and a camera 14 that communicate with a processor 20. The transceiver 26 typically includes a transmitter circuit 27, a receiver circuit 28, and a modem 29, which cooperate to transmit and receive radio frequency signals to remote transceivers via an antenna 25. The radio frequency signals transmitted between the communication terminal 10 and the remote transceivers may comprise both traffic and control signals (e.g., paging signals/messages for incoming calls), which are used to establish and maintain communication with another party or destination.

The memory 16 may be a general purpose memory that is used to store both program instructions for the processor 20 as well as data, such as audio data, video data, configuration data, and/or other data that may be accessed and/or used by the processor 20. The memory 16 may include a nonvolatile read/write memory, a read-only memory and/or a volatile read/write memory.

Figure 2:
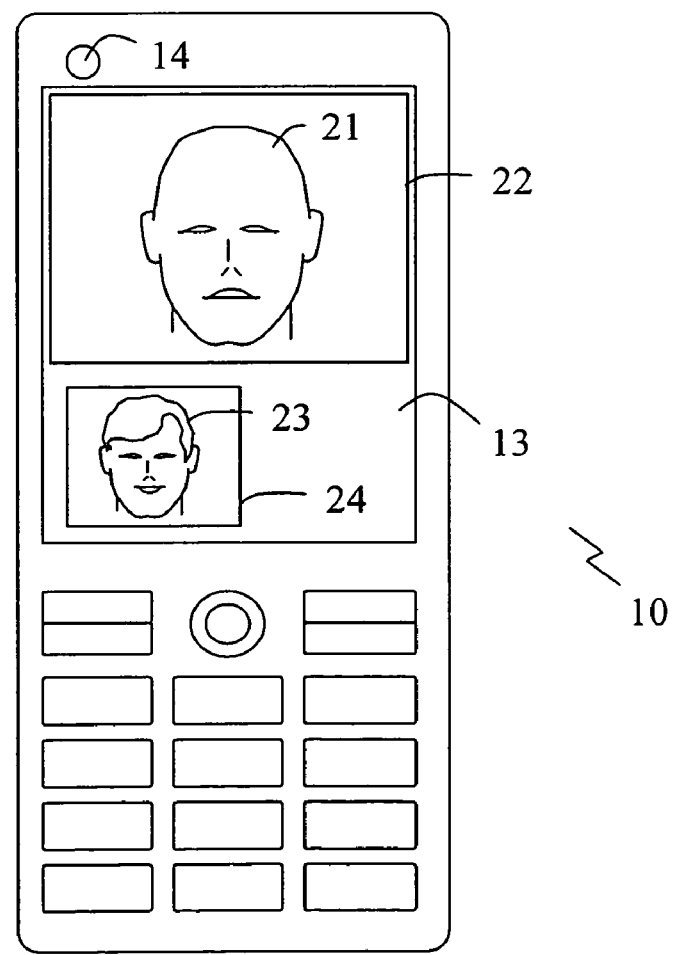
FIG. 2 illustrates the terminal of FIG. 1 when used for videoconferencing according to some embodiments of the invention.

Referring to FIG. 2, the use of a communication terminal 10 for video telephony is illustrated. Typically, in a video telephony session, an image 21 of the remote party is transmitted to the terminal 10 and presented on the display 13 within a dedicated frame 22. At the same time, a smaller image 23 of the user of the terminal 10, captured by the camera 14, may also be presented on display 13 within a frame 24. The frame 24 may be displayed within a separate frame/display of the terminal 10 and/or within a sub-frame of the display 13 as a picture-in-picture. This way, the user may receive visual feedback of how the camera 14 is aimed, and may handle the terminal 10 for proper aiming.

Figure 3:
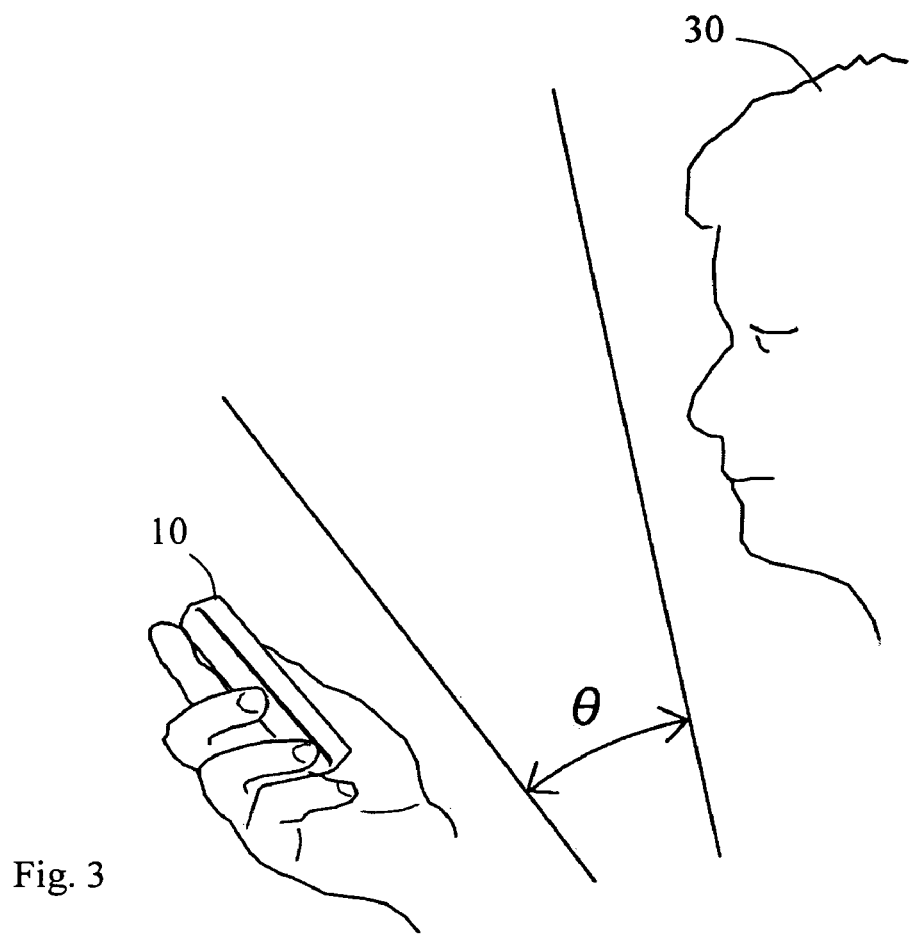
FIG. 3 schematically illustrates how a camera of a terminal is held at an angle to the face of a user.

A problem related to video telephony has already been described, namely that it may be more comfortable to hold the terminal 10 at a certain angle to the user 30, marked θ in FIG. 3, rather than parallel to the face of the user. Positioning the terminal 10 at an oblique angle to the object to be imaged, typically the face of the user, may also make it easier to use the terminal 10 for video telephony by placing the terminal on a support, e.g. a desktop surface. However, tilting of a conventional terminal may lead to a displacement effect of the captured image, since the camera may not be aimed correctly. The displacement of the captured image within its dedicated image frame will be visible on display, and of course also for the remote party receiving the captured images. With an increasing angle θ, the face of the user may drop down in the frame. At some point, the face will fall out of the field of view of the camera, which may typically be in the range of 50-70° full angle.

Figure 4:
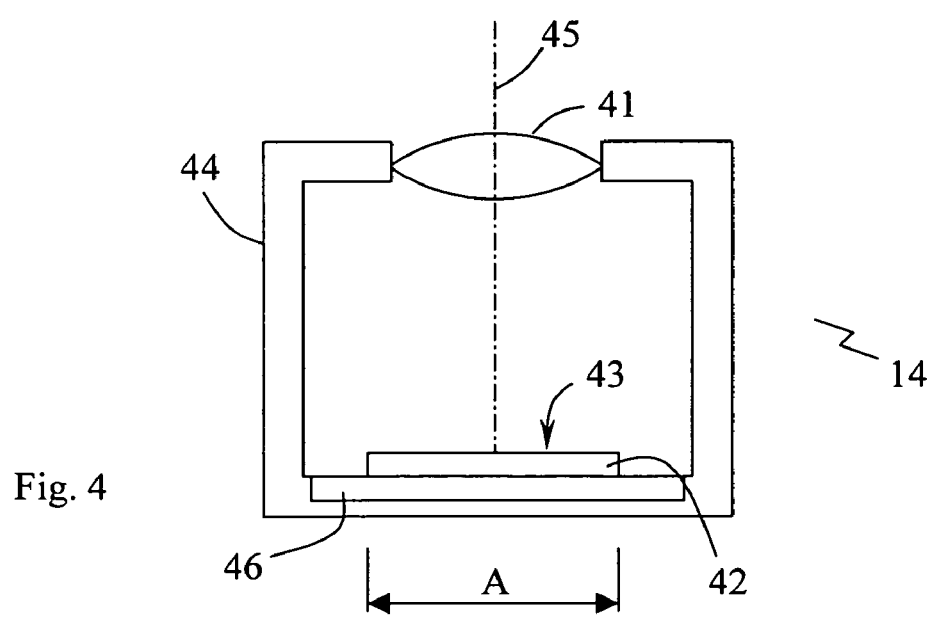
FIG. 4 schematically illustrates a digital camera module according to some embodiments of the invention.

FIG. 4 schematically illustrates a digital camera module 14, for use in an electronic device such as terminal 10 according to some embodiments of the invention. The camera module 14 includes an optical lens 41 including one or more individual lenses made of e.g. plastic or glass, and having an optical axis 45 indicated by the dash-dotted line. A detector 42 with an upper detector surface 43 is positioned at a distance from and parallel to the lens 41 by means of a support member 44, which may include a sealed plastic housing. The camera module may also include an image signal processor (ISP) 46, which may be connected to the backside of the detector 42. Alternatively, the ISP 46 may be connected to detector 42 by wire, e.g. a flex cable. The geometry of the camera module 14, including the focal length and aperture of lens 41 and the size of the image plane defined by detector surface 43 and its position relative to lens 41, defines the field of view of the camera module 14. For the purpose of clearly describing the invention, the term main line of sight will be used to denote the chief ray through lens 41 to the center of the image area used. Typically, the detector surface 43 is positioned centrally under the lens 41, and the main line of sight of the camera 14 therefore coincides with the optical axis 45. The detector surface 43 may generally be rectangular or even square, and may be symmetric about the optical axis 45.

Figure 5:
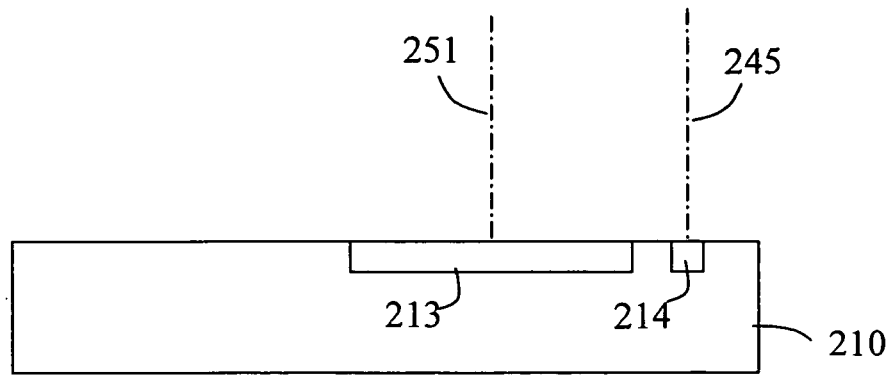
FIG. 5 schematically illustrates a conventional camera phone.

FIG. 5 illustrates a conventional terminal 210 including a camera 214 and a display 213. In FIG. 5, axis 251 indicates the normal direction of display 213, i.e. an axis perpendicular to the surface of display 213. Furthermore, optical axis 245, which represents the main line of sight for the camera 214, is indicated as being substantially parallel to the normal direction 251.

Figure 6:
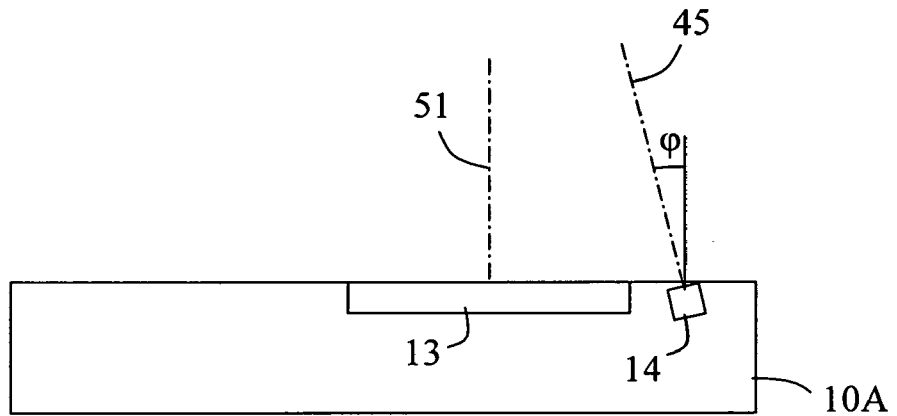
FIG. 6 schematically illustrates some aspects of a camera phone according to some embodiments of the invention.
Figure 7:
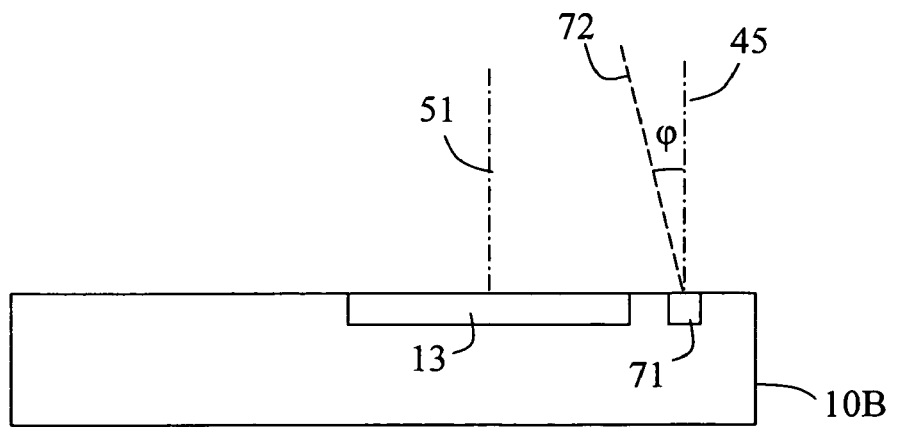
FIG. 7 schematically illustrates some aspects of a camera phone according to further embodiments of the invention.

FIGS. 6-7 illustrate terminals 10A, 10B according to some embodiments of the invention in a simplified side view in which only the display 23 and the camera 14 are illustrated. FIG. 6 illustrates a terminal 10A in which the camera 14 is oriented such that its optical axis and main line of sight 45 is fixed at an angle relative to the normal direction 51 by an acute angle φ. In some embodiments, the camera 14 may be tilted an angle φ which corresponds to a desired operation angle θ as indicated in FIG. 3. This way, the terminal 10A may be used for video telephony when held at an angle to the user without displacing the captured image. However, in these embodiments, since the camera 14 is tilted, it may occupy more space in the terminal 10A. Furthermore, fastening of the camera 14 onto e.g. a PCB (Printed Circuit Board) in a tilted orientation in the terminal 10A may require additional mounting apparatus, such as an intermediate wedge element.

FIG. 7 illustrates a terminal 10B according to further embodiments of the invention in which reference numeral 51 indicates the normal direction of the display 13, i.e. an axis perpendicular to the surface of the display 13. Furthermore, the optical axis 45 of a camera 71 is indicated as being substantially parallel to the normal direction 51. The camera 71 may be fastened inside the terminal 10B substantially parallel to the display 13, e.g. by soldering or other type of bonding and connection to a common PCB. However, the field of view of the camera 71, having a main line of sight 72, is defined by an operative region of the detector surface 43 which may be displaced off-center in relation to the optical axis 45 of the lens (see FIG. 4). The operative region may be the full area of the detector surface 43, wherein the entire detector surface is off-centered. Alternatively, the operative region may be an off-center portion of an otherwise centered detector surface 43, in which case the camera 71 may be substantially similar to the camera 14 in terms of the elements shown. The difference lies in which pixels of the detector surface are used for reading out the image.

Figure 8:
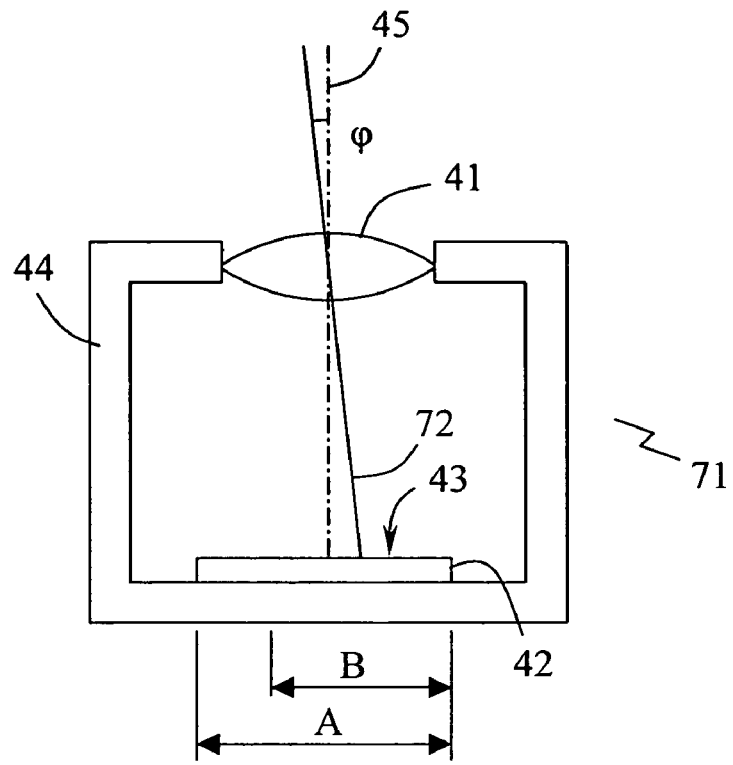
FIGS. 8 and 9 schematically illustrate a digital camera module according to some embodiments of the invention.
Figure 9:
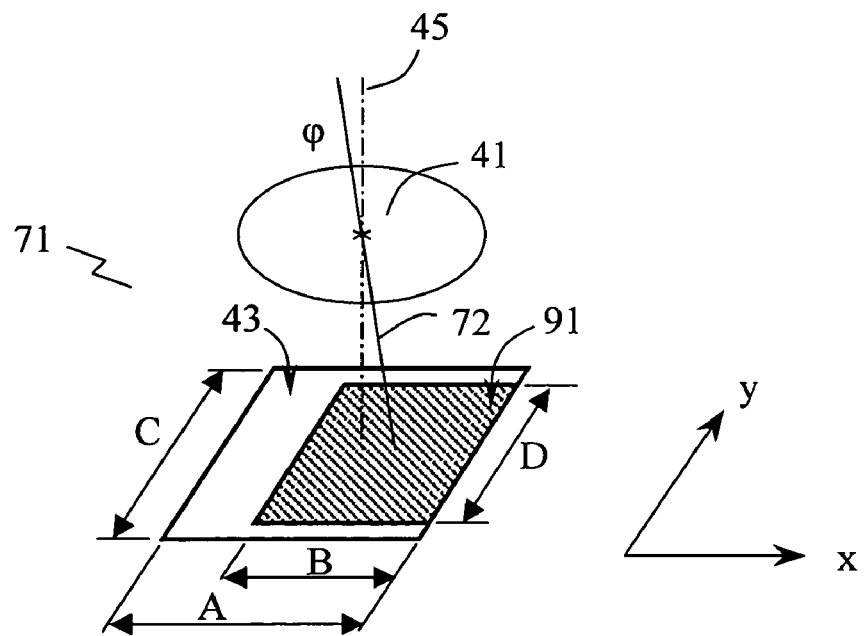

FIGS. 8 and 9 schematically illustrate some aspects of a camera 71 according to some embodiments of the invention. References used in FIG. 4 are also used in FIGS. 8 and 9 for corresponding elements. The ISP 46 is left out of FIGS. 8 and 9, since it need not be mechanically attached directly to the camera module 71. FIG. 8 is a side view of the camera 71, and FIG. 9 is a perspective view of the camera 71 in which the support member 44 has been left out for the sake of simplicity.

The detector 42 may include an image sensor having a full size detector surface 43 within the area defined by length A and width C, and may include a number of pixels, e.g. 400× 400, 640×480, or any other matrix arrangement. In this embodiment, though, an operative region 91 of the detector surface 43 is defined, which includes only a subset of the full number of pixels. In the illustrated example, the region 91 (dashed area) is rectangular and has a length B<A and a width D<=C. Furthermore, the operative region 91 may be displaced off-center relative to a center of detector surface 43, where the optical axis 45 of the lens 41 intersects the detector surface 43. It may be possible to define the region 91 to be off-centered along both the x and y axis indicated in FIG. 9. However, in the illustrated embodiment, the region 91 is off-centered along the x axis only, and is centered along the y axis. The operative region 91 may be displaced off-center towards the right-hand side edge along the x axis, and may occupy all pixels out to the right-hand side edge but not all pixels towards the left-hand side edge of the detector surface 43. Alternatively, the operative region may be less off-center, and may not include the outermost pixels on the right-hand side of the detector surface 43. Along the y-axis, the operative region 91 may be narrower D than the full width C of detector surface 43, as exemplified in the drawing.

The center of operative region 91 may be the center of the sensing image plane, and a main line of sight 72 may be defined from the center of operative region 91 and the optical center of lens 41. This main line of sight may extend at an acute angle φ to the optical axis 45, where the magnitude of φ may be dependent on the distance between the center of operative region 91 and the optical axis 45. Being acute, angle φ is by definition more than 0° and less than 90°. However, for practical reasons the angle may be in the range of 5-20° or even 5-10°.

As an example, the detector surface 43 may include a 400×400 pixel matrix of image sensors. However, for the purpose of videoconferencing, this may be an excessive amount of pixels. QCIF (Quarter Common Intermediate Format) is a videoconferencing format that specifies data rates of 30 frames per second (fps), with each frame containing 144 rows and 176 pixels per row. This is one fourth the resolution of Full CIF, which defines 355×288 pixels. QCIF support is required by the ITU H.261 videoconferencing standard, and as such only a 176×144 pixel matrix is thus required. This is less than half the accessible number of pixels in each direction. For the purpose of enhancing the image quality it is therefore possible to make use of twice as many rows with twice as many pixels per row, i.e. a CIF, which still fits in the 400×400 matrix.

In some embodiments, an operable region 91 including 355×288 pixels is defined on detector surface 43 including 400×400 pixels, extending inwardly from one side edge of the centered detector surface 43, and centered in along that side edge, as shown in FIG. 9. A 3.2×3.2 mm detector 42 with a pixel pitch of 3.6 μm has a detector surface (A×C) of about 1.44×1.44 mm, and the operable region will have a length B of 288/400×1.44=1.037 mm. The center of the operable region may then be positioned 1.44/2−1.037/2=0.2 mm from the center of the detector surface 43. Assuming the lens 41 is positioned at a height of 1.5 mm from the detector surface 43, the main line of sight 72 will then have an angle of about φ=arctan(0.2/1.5), approximately 7.6°, to the optical axis 45. Using only a QCIF matrix, the corresponding angle would be arctan(1.44*(1−144/400)/(2*1.5)), or approximately 17.10. However, even if a QCIF image is to be used, it may be possible to make use of the full CIF image plane to enhance the image quality.

It may also be possible to define the operative region by means of a backwards calculation. For example, assuming the camera will be used at a certain angle θ of e.g. 10°, and a QCIF matrix is to be employed. The necessary off-centering A of operative area 91, when the distance to the lens is 1.5 mm, is then Δ=1.5 tan(10°), or approximately 0.26 mm. For such a configuration, the operative region 91 will not go all the way out to the edge of detector surface 43; rather, there will be some 55 unused pixel rows at the top of the detector surface 43.

It is to be understood that the numbers presented above are merely given as possible examples, whereas providing an off-centered operable region of a detector surface for the purpose of obtaining a field of view with a main line of sight which is angled with reference to the optical axis of the camera lens, may be applicable to any camera geometry, as schematically illustrated in FIG. 4. The detector 42 may be e.g. a CMOS detector or a CCD detector, and may be a black and white, grey scale or color image detector. Furthermore, the operable region 91 may be specified in hardware or firmware for the camera ISP as an off-center region of interest or window of interest. In some embodiments, the size and position of the operable region 91 may be set as a default value, and thereby always used unless user commands are given to change this setting, e.g. by means of input interface 12.

Figure 10:
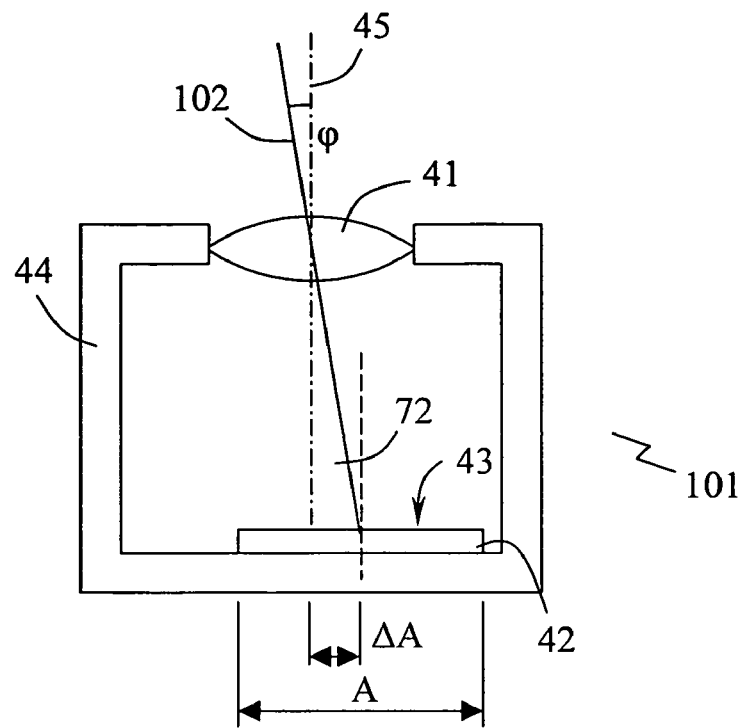
FIGS. 10 and 11 schematically illustrate a digital camera module according to further embodiments of the invention.

FIG. 10 illustrates embodiments which may be provided as an alternative to the embodiments described with reference to FIGS. 8 and 9, or which may be combined with the embodiments of FIGS. 8 and 9. Similar to the camera 14 illustrated in FIG. 4, camera 101 of FIG. 10 includes a lens 41 and a detector 42 with a detector surface 43, suspended parallel to and spaced apart from lens 41 by a support member 44, and potentially an attached ISP (not shown). An optical axis 45 is defined for the lens 41. The detector surface 43 has a length A. However, in this case, the detector 42 may not be placed centrally under the lens 41. Instead, the detector 42 is laterally displaced in relation to the lens 41, such that the optical axis 45 of the lens 41 is displaced off-center with respect to the detector surface 43. In FIG. 10, this is illustrated by the detector 42 being laterally displaced in the support member 44. Alternatively, the lens 41 may instead be laterally displaced in the support member 44.

By this feature, the main line of sight 102 of the field of view for the camera 101, extending from the center of detector surface 43, may extend at an acute angle φ from the optical axis 45, where the magnitude of angle φ is proportional to arctan(ΔA/h), where ΔA is the relative lateral translation and h is the distance between lens 41 and detector surface 43. As an example, if lateral displacement ΔA of the detector 42 is 0.2 mm as indicated in FIG. 10, and the distance between the lens 41 and the detector surface 43 is 1.5 mm, the main line of sight will have an angle φ of about 7.6°.

As indicated, it is possible to combine the embodiments of FIGS. 8 and 9 with the embodiments of FIG. 10, whereby an operable region is defined at the right-hand side of the detector 42, and where the detector 42 is also laterally translated to the right with reference to the lens 41. As an example, consider the example outlined for the embodiment of FIG. 9 with a 400×400 pixel detector surface 43 with a 3.6 μm pixel pitch, arranged 1.5 mm below lens 41, and furthermore a lateral displacement ΔA of detector 42 of 0.2 mm is employed as indicated in FIG. 10.

For a CIF embodiment, the operable region 91 may extend 288 rows inwardly from the side edge of the detector surface 43 which is most remote from optical axis 45. The center of the operable region is then positioned 1.44/2−1.037/2+ 0.2=0.4 mm from the optical axis, which means an angle of about α=arctan(0.4/1.5), or approximately 15°, to optical axis 45. For a QCIF matrix it is possible to have an even larger angle, or alternatively to use the CIF image and scale it to a QCIF.

Figure 11:
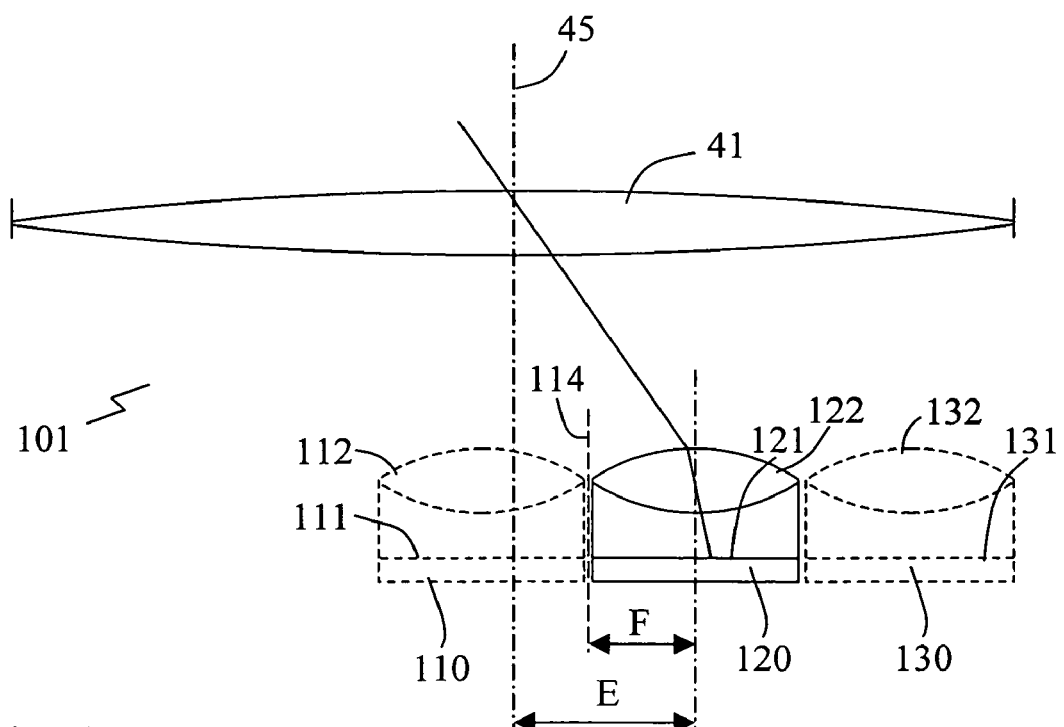

For embodiments in which the detector surface 43 is laterally displaced with respect to the optical axis 45, an improved camera may be obtained by also adapting each pixel element to this off-centered optical geometry. FIG. 11 schematically illustrates certain elements of a camera 110 according to some embodiments of the invention. FIG. 11 illustrates a camera lens 41 and three pixels 110, 120, 130 of a detector 42. A vertical dashed line 114 is shown between pixels 110 and 120, indicating the center of the detector surface 43 of the detector 42, whereas the optical axis 45 intersects the center of the lens 41. Normally, the center of the detector surface 43 and the optical axis 45 may coincide, but according to the embodiments described with reference to FIG. 10 they may be spaced apart by a distance ΔA.

In order to guide incoming light properly to the sensor elements of the detector 42, each pixel may include a sensor including a light sensing element 111, 121, 131, such as a photodiode, and a micro condenser lens 112, 122, 132. The use of micro lenses as a part of an image sensor is a common technology for enhancing the performance of a sensor, as shown in e.g. U.S. Pat. No. 5,251,038. Accordingly, each pixel of detector 42 may include a micro condenser lens on top of the sensor element in order to guide the light rays into the sensor element.

The formation and placement of micro lenses may depend on the chief ray angle of the light bundle striking the sensor. The angle may differ with image height, i.e. the distance from the center optical axis 45 of camera lens 41. Typically, the farther away from optical axis 45 the sensor is positioned, the shorter the focal length of the condenser lens has to be. In a typical configuration, the focal length of the micro lenses increases when moving away from the center of the detector surface 43, and for lens 122, the focal length may be trigonometrically dependent on the distance F to the center 114 of the detector surface 43. However, in the case of embodiments according to FIG. 10 with a translation ΔA, the micro lenses may be adapted to an optical center, still as defined by the optical axis 45, which is no longer the center of the detector surface 43. Therefore, in some embodiments of the invention an intended optical center 45 for the detector surface 43 is defined, which may not coincide with the physical center 114 of the detector surface 43 and which will be the real optical center when it is combined with the lens 41.

The micro lenses of each pixel of the detector surface 43 may then be carefully designed with reference to the defined optical center, typically with increasing focal length as a function of increasing distance to the optical center. The focal length for the lens 122 may be trigonometrically dependent on the distance E (=F+ΔA) to the optical center, i.e. the optical axis 45. Specific relations are dependent of the overall design of the camera, and the considerations needed to be taken are well known to a person skilled in the art.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An electronic device, comprising:
   a support structure,
   a camera including a detector surface ad a lens having a optical axis, carried by the support structure ad having a field of view, and
   a display carried by the support structure in a fixed relation to the camera, having a normal viewing angle perpendicular to a surface of the display, wherein the field of view of the camera has a main line of sight extending at a acute angle to the normal viewing angle of the display;
   wherein the field of view of the camera is defined by a operative region or the detector surface, Which operative region is displaced off-center in relation to the optical axis of the lens along an axis parallel to a length of the electronic device, the length being a longest dimension of the electronic device.

2. The electronic device of claim 1, further comprising a transceiver configured to transmit an image captured by the camera and to receive a remotely generated image.

3. The electronic device of claim 2, wherein the electronic device is configured to simultaneously display both the image captured by the camera and the remotely generated image.

4. The electronic device of claim 1, wherein the detector surface comprises a image sensor including a number of pixels, ad the operative region comprises a subset of said number of pixels.

5. The electronic device of claim 1, wherein the detector surface is rectangular, and the operative region is displaced off-center towards one of two opposing edges of the detector surface.

6. The electronic device of claim 5, wherein the detector surface includes two complementary opposing edges perpendicular to the two opposing edges, and the operative region is centered between the two complementary opposing edges of the detector surface.

7. The electronic device of claim 1, wherein the optical axis of the lens is parallel to the normal viewing angle of the display.

8. The electronic device of claim 1, wherein the optical axis of the lens is displaced off-center with respect to the detector surface.

9. The electronic device of claim 5, wherein the optical axis of the lens is displaced off-center with respect to the detector surface, towards the other of the two opposing edges of the detector surface.

10. The electronic device of claim 7, wherein the detector surface comprises a number of pixels, each pixel including a sensor element and an auxiliary lens, wherein at least one of the auxiliary lenses has a focal length that is inversely dependent on a distance from the at least one auxiliary lens to the optical axis of the camera lens.

11. The electronic device of claim 4, wherein the image sensor comprises a CMOS sensor.

12. The electronic device of claim 4, wherein the image sensor comprises a CCD sensor.

13. The electronic device of claim 4, wherein the image sensor is connected to an image signal processor that is configured to define the operative region as a region of interest for reading out an image.

14. The electronic device of claim 1, wherein the acute angle is more than 0° and less than about 20°.

15. The electronic device of claim 1, wherein the acute angle is between about 5° and about 20°.

16. The electronic device of claim 1, wherein the acute angle is between about 5° and about 10°.

17. The electronic device of claim 1, further comprising a microphone configured to receive an audio signal and to transmit the received audio signal using the transceiver, and a speaker configured to play an audio signal received using the transceiver.

18. The electronic device of claim 1, wherein the detector surface comprises a two-dimensional array of pixels configured to detect an image from light passing through the lens.

* * * * *

UNITED STATES PATENT AND TRADEMARK OFFICE
CERTIFICATE OF CORRECTION

| | | |
|---|---|---|
| PATENT NO. | : 7,822,338 B2 | Page 1 of 1 |
| APPLICATION NO. | : 11/407670 | |
| DATED | : October 26, 2010 | |
| INVENTOR(S) | : Wernersson | |

It is certified that error appears in the above-identified patent and that said Letters Patent is hereby corrected as shown below:

In the Claims:

Column 9, Claim 1, Line 45: Please correct "ad" to read -- and --
                 Line 46: Please correct "ad" to read -- and --
                 Line 52: Please correct "a acute" to read -- an acute --
                 Line 53: Please correct "by a" to read -- by an --
                 Line 54: Please correct "region or" to read -- region of --
                      and please correct ",Which" to read -- , which --

Column 10, Claim 4, Line 8: Please correct "comprises a" to read -- comprises an --
                  Line 9: Please correct "pixels, ad" to read -- pixels, and --

Signed and Sealed this
Twenty-second Day of February, 2011

David J. Kappos
*Director of the United States Patent and Trademark Office*